United States Patent [19]

Wu

[11] Patent Number: 5,442,623
[45] Date of Patent: Aug. 15, 1995

[54] PASSIVE PROTECTED SELF HEALING RING NETWORK

[75] Inventor: Tsong-Ho Wu, Howell, N.J.

[73] Assignee: Bell Communications Research, Inc., Livingston, N.J.

[21] Appl. No.: 931,082

[22] Filed: Aug. 17, 1992

[51] Int. Cl.$^6$ ............................................. H04J 1/16
[52] U.S. Cl. ............................... 370/16.1; 340/825.05; 359/110; 359/118; 370/85.12
[58] Field of Search ............... 370/13, 16, 16.1, 85.12, 370/85.15, 85.4, 85.14; 359/117, 118, 110, 113; 371/8.1, 8.2; 340/825.05, 825.5

[56] References Cited

U.S. PATENT DOCUMENTS

| | | | |
|---|---|---|---|
| 4,190,821 | 2/1980 | Woodward | 371/8.2 |
| 4,682,326 | 7/1987 | Ulug | 370/85.4 |
| 4,704,713 | 11/1987 | Haller et al. | 370/16 |
| 4,951,280 | 8/1990 | McCool et al. | 370/16.1 |
| 5,050,164 | 9/1991 | Chao et al. | 370/124 |
| 5,069,521 | 12/1991 | Hardwick | 359/110 |
| 5,113,398 | 5/1992 | Howes | 370/16 |
| 5,179,548 | 1/1993 | Sandesara | 370/85.12 |
| 5,218,604 | 6/1993 | Sosnosky | 370/16.1 |
| 5,303,387 | 4/1994 | Millard et al. | 340/825.05 |
| 5,307,353 | 4/1994 | Yamashita et al. | 370/16.1 |
| 5,317,198 | 5/1994 | Husbands | 370/16.1 |
| 5,341,364 | 8/1994 | Marra et al. | 370/16.1 |
| 5,355,362 | 10/1994 | Gorshe et al. | 370/16.1 |

OTHER PUBLICATIONS

R. Ballart et al., "Sonet Now It's the Standard Optical Network," 0 i IEEE Communications Magazine, Mar. 1989, pp. 8-15.

W. I. Way et al. "Applications of Optical Power Limiting Amplifiers in Self-Healing Ring Networks," *Proceedings of the 17th European Conference on Optical Communications*, Sep. 1991, pp. 605-608.

Molex Technologies, Inc. 1990 Catalogue-FDDI Dual Fiber Optic Bypass Switch.

*Primary Examiner*—Douglas W. Olms
*Assistant Examiner*—Shick Hom
*Attorney, Agent, or Firm*—Leonard Charles Suchyta

[57] ABSTRACT

A self healing, passive protected ring network and a method of operation are disclosed. The ring network includes a plurality of active nodes interconnected by optical fibers into a working ring. The ring network also includes a passive optical fiber protection ring which interfaces with the working ring through a small number of optical switches located at each node. In the event of a failure in the optical fibers or nodes of the working ring, the optical switches are set to interconnect the protection ring to the nodes on either side of the failure and to bypass all other nodes. It is a particular advantage of the present invention that the protection ring may be installed without modifying or adding to the active electronic equipment at each node and remains unchanged when the working ring's equipment is upgraded to a higher line transmission rate.

10 Claims, 11 Drawing Sheets

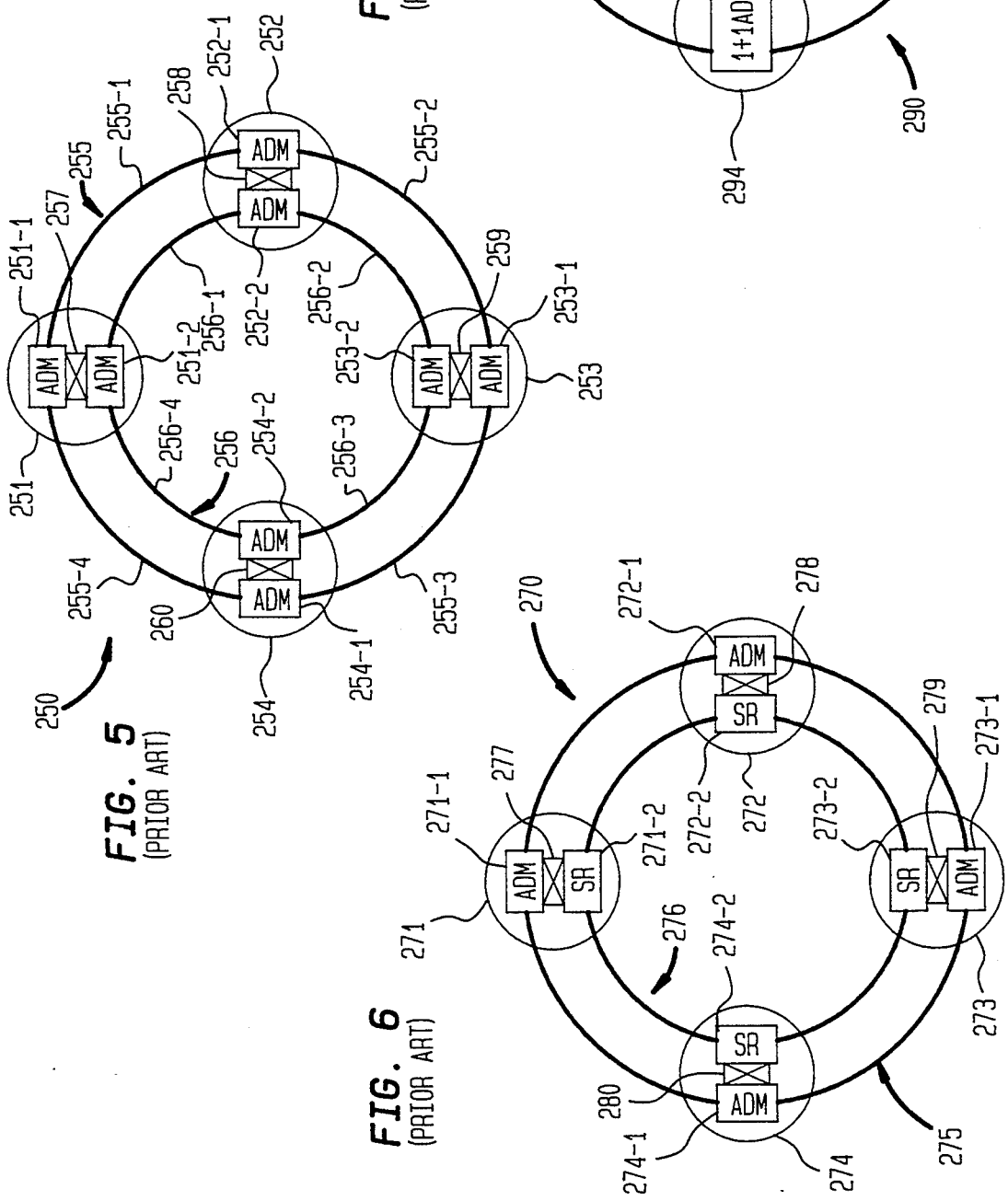

PASSIVE PROTECTED SELF HEALING RING NETWORK

RELATED CASE

The subject matter of the present invention is related to the subject matter of U.S. patent application Ser. No. 07/722,051 entitled "Self Healing Bidirectional Logical-ring Network Using Crossconnects" filed Jun. 27, 1991 for Niranjan Sandesara and assigned to the assignee hereof, now U.S. Pat. No. 5,179,548, issued Jan. 12, 1993. The entire contents of this application are incorporated herein by reference,

1. Field of the Invention

The present invention relates to a fiber optic ring network, particularly a bidirectional four-fiber network, comprising active electronic nodes interconnected by optical fibers into one or more working rings. The working rings carry optical signals under ordinary circumstances, i.e., no failures. The ring network also includes one or more passive protection fiber optic rings for bypassing failed components in the working rings. The passive protection rings utilized in accordance with the present invention require no modifications of, or additions to, electronic processing equipment contained in the nodes.

2. Background of the Invention

A conventional fiber optic ring network 100 is depicted in FIG. 1. The ring network 100 comprises a plurality of nodes 101–104 interconnected by optical fibers 105–112 to form the rings 113 and 114. The rings 113 and 114 carry data around the network. Often, each ring is designed so that data may be transmitted around that particular ring either in a clockwise or a counter clockwise direction but not both. For instance, as depicted by the direction arrow 115, data propagates in a clockwise direction around the ring 113. Additionally, as depicted by the direction arrow 116, data propagates around the ring 114 in a counter clockwise direction.

Rings, such as the rings 113 and 114, which carry data under ordinary circumstances, i.e., no failures in the ring network 100, are called working rings. Usually, each working ring comprises the nodes of the ring network and an optical fiber connected between each of the nodes. For instance, the working ring 113 comprises the nodes 101–104 and the optical fibers 105–108. Similarly, the working ring 114 comprises the nodes 101–104 and the optical fibers 109–112.

Each node 101–104 of the ring network 100 can transmit a modulated optical signal at a wavelength which can be detected by the next downstream node in the direction of data propagation 115 or 116 around a particular ring 113 or 114 of the ring network 100. Data is transmitted from an originating node to a destination node by passing through each intermediate node therebetween on the working ring. For instance, data originating at the node 101, and transmitted to the destination node 104 on the working ring 113, passes through the intermediate nodes 102 and 103. The two working rings 113 and 114 form a bidirectional optical fiber ring if data transmitted on each channel of a duplex channel between two nodes uses the same physical path, i.e., is routed through the same nodes. For example, if data from the node 104 is transmitted to the node 102 (on the working ring 114) via the intermediate office 103 and if data from the node 102 is transmitted to the node 104 (on the working ring 113) via the intermediate node 103, the rings 113 and 114 form a bidirectional ring.

Each node typically comprises electronic processing equipment for converting received optical signals into electronic form. While in electronic form, data may be written to or read from the signal. The signal is then converted back into optical form for transmission to the next downstream node.

A ring network may be designed to use the SONET (Synchronous Optical Network) signal hierarchy. As used herein, the term SONET refers to a hierarchical family of digital signals whose bit rates are integer multiples of a basic module signal. See R. Ballart & Y. C. Ching, "SONET: Now It's the Standard Optical Network," *I.E.E.E. Communications Magazine*, March, 1989, p.8–15. The basic module signal, referred to as the Synchronous Transport Signal-Level 1 (STS-1), is formed from a sequence of repeating frames. Each frame includes a fixed number of eight bit bytes. Some of these bytes are specifically allocated for carrying section, line and path overhead data. The remaining bytes may be used for the transmission of information data. Higher bit rate SONET signals may be obtained by byte interleaving N frame aligned STS-1 signals to form an STS-N signal in accordance with conventional SONET technology. When transmitted using optical fibers, the STS-N signal is converted to optical form and is designated the OC-N signal.

In the case that the ring network supports data transmission using the SONET signal hierarchy, each node of the ring network is provided with an add-drop multiplexer (ADM) which terminates one or two fibers connected on either side of the ADM. The ADM is provided for receiving and transmitting data on the ring network according to the SONET signal hierarchy. Referring to FIG. 1, each node 101, 102, 103, 104 includes one ADM 117, 118, 119 and 120, respectively. Illustratively, the ring network 100 forms part of a telecommunications network. As such, a central office 121–123 is shown connected to the ADMs 117–119 of each of the nodes 101–103, respectively. Similarly, a hub 124 is shown connected to the ADM 120 of the node 104, however, the node 104, itself, may be a hub.

Each ADM 117–120 receives the frames of a SONET optical signal propagating on each working ring 113–114 of the ring network 100 and regenerates the frames for output onto the particular working ring 113 or 114 from which the corresponding SONET optical signal was received. Each ADM 117–120 may write data into designated time slots of the frames and may read data from designated time slots. Typically, each ADM 117–120 reads only the data destined for the corresponding node 101–104 at which the ADM is located. This data is then terminated, i.e., not regenerated. Received data which is destined for another node, is regenerated for output to the next downstream node on the particular working ring 113 or 114 from which the data was received.

The ring network 100 may achieve connections between specific pairs of nodes as follows. A SONET signal comprising frames divided into time slots circulates around each working ring 113 and 114. The frames received at the input of each ADM 117–120 (e.g., the input 125 of the ADM 117) are regenerated at the output of each ADM 117–120 (e.g., the output 126 of the ADM 117). Each ADM 117–120 can write data into particular time slots for transmission to a remote ADM 117–120. For example, the central office 121 inputs data to the ADM 117 via the line 127 and the ADM 117 in turn writes this data into particular time slots of the SONET signal circulating around the ring 113. Each ADM 117–120 can also read data out of particular time slots originating from a remote ADM. In each SONET frame, particular time slots can be permanently dedicated to connections between particular pairs of nodes. For example, slot #1, slot #2 and slot #17 in each frame may be dedicated to communication between the node 102 and the node 104.

It is desirable to provide a ring network which automatically maintains operations in the event of one or more failures such as failures of optical fibers and nodes. Such networks are referred to as self healing ring networks. To that end, one or more additional rings, called protection rings, may be provided for the propagation of data in the event of a failure.

As depicted in FIG. 2, a self healing ring network 200 is shown with a bidirectional working ring comprising the two rings 201 and 202, which bidirectional working ring includes the nodes 205–208. The working ring 201 also includes the optical fibers 201-1, 201-2, 201-3 and 201-4. Similarly, the working ring 202 includes the optical fibers 202-1, 202-2, 202-3 and 202-4. The ring network 200 also has a bidirectional protection ring comprising the two rings 203 and 204, which bidirectional protection ring also comprises optical fibers, i.e., 203-1, 203-2, 203-3, 203-4, and 204-1, 204-2, 204-3, 204-4, respectively. Illustratively data propagates around the working ring 201 and the protection ring 204 in a clockwise direction. Additionally, data illustratively propagates around the working ring 202 and the protection ring 203 in a counter clockwise direction. Such a ring network 200 is called a bidirectional four fiber self healing ring as defined by ANSI T1X1.5 standards. For convenience, automatic switching is illustrated below with reference to FIGS. 3 and 4 for bidirectional four fiber self healing ring networks. Implementations for the nodes 205–208 are discussed below in FIGS. 5, 6 and 7.

In FIG. 3, the same bidirectional four fiber self healing ring network 200 is depicted with a fiber optic cable cut depicted by a large "X" between the nodes 205 and 206 (i.e., all of the optical fibers 201-1, 202-1, 203-1 and 204-1 are cut). As depicted by directional arrows in the node 205, any data arriving at the node 205 on the optical fiber 201-4 is regenerated onto the optical fiber 203-4. Thus, data arriving at the node 205 on the working ring 201 is rerouted to the protection ring 203. The data then propagates in a counter clockwise direction around the protection ring 203 to the node 206 where it arrives on the fiber 203-2 and is routed back to the working ring 201 on the fiber 201-2. In a similar fashion (as depicted), data arriving at the node 206 on the optical fiber 202-2 is regenerated onto the optical fiber 204-2. Thus, data arriving at the node 206 on the working ring 202 is rerouted to the protection ring 204. The data propagates in a clockwise direction around the protection ring 204 to the node 205 where it arrives on the fiber 204-2 and is routed back to the working ring 202, on the fiber 202-4. Such a protection switching scheme is referred to as "loopback" protection switching.

In FIG. 4, the same bidirectional four fiber self healing ring network 200 is shown with a failed optical fiber 202-4 in the working ring 202 between the nodes 205 and 208 (depicted by an "X"). In order to restore operations on the working ring 202, data arriving at the node 205 on the optical fiber 202-1 is regenerated onto the optical fiber 203-4. Thus, data arriving at the node 205 on the working ring 202 is rerouted to the protection ring 203. This data, which arrives at the node 208 on the protection ring 203, via the fiber 203-4, is then routed back to the working ring 202 on the fiber 202-3. Such a protection switching scheme is referred to as "span" protection switching.

The self healing ring networks may automatically detect a failure and execute a protection switching scheme, such as the loopback or span scheme discussed above. As illustrated in FIGS. 2, 3 and 4 above, each node on either side of a failed component in the ring network performs protection switching to avoid the failure. According to one proposed SONET protection switching protocol in the ANSI T1X1.5 standard group, two particular line overhead bytes, the K1 and K2 bytes are used for relaying protection switching messages between the two nodes adjacent to the failure. A node, which is adjacent to, and which detects a failure, request protection switching at another node adjacent to the failure by transmitting the K1 and K2 bytes to that other node. The K1 byte is used to indicate a request for protection switching and the K2 byte is used to indicate the type of protection switching requested (e.g., loopback protection switching, span protection switching, etc.). Additionally, a node may transmit the K2 byte without the K1 byte in order to confirm receipt of a protection switching request message.

According to this proposal, a node which is adjacent to, and which detects, a failure generates and transmits a protection switching request message by transmitting the K1 and K2 bytes on one or more rings of the ring network. A node receiving the request message verifies it for three consecutive frames. If the K1 and K2 bytes are destined for another node, the node which received the request message regenerates the message onto the ring from which the message was received. When a request arrives at its destination node, it is terminated and the appropriate protection switching is performed. This node additionally transmits the K2 byte as a confirmation message to the node which detected the failure. The destination node may also transmit a request for appropriate protection switching to the node which detected the failure by transmitting both the K1 and K2 bytes. Thus, protection switching is performed on either side of a failure in the ring network.

Three implementations for the nodes of the prior art self healing ring network are now discussed. For purposes of clarity, only ring network architectures with one working ring and one protection ring are shown. It may be appreciated, however, that the discussion holds for an architecture with two or more working rings in an analogous manner.

Referring now to FIG. 5, a first prior art self healing ring network 250 is shown with four nodes 251–254, a working ring 255, which comprises the optical fibers 255-1, 255-2, 255-3 and 255-4, and a protection ring 256, which comprises the optical fibers 256-1, 256-2, 256-3 and 256-4. As depicted, the working ring 255 includes the ADMs 251-1, 252-1, 253-1 and 254-1. Similarly, the protection ring includes the ADMs 251-2, 252-2, 253-2 and 254-2. Additionally, a protection switch 257, 258, 259 and 260 is connected between each pair of ADMS 251-1 and 251-2, 252-1 and 252-2, 253-1 and 253-2, and 254-1 and 254-2, respectively.

In the event of a failure, data received at the ADM of a particular node may be transmitted, via the protection switch 257, 258, 259 or 260, to the other ADM at that node. For instance, data arriving on the optical fiber 255-4 at the node 251 is received at the ADM 251-1. This data may be transmitted via the protection switch 257 to the ADM 251-2 where it is regenerated onto the optical fiber 256-4. Similarly, the data propagating on the protection ring 256 may be received at a corresponding ADM at another node and rerouted back to the working ring 255 via a protection switch at that other node.

FIG. 6 shows a second prior art self healing ring network 270 which is similar to the first prior art self healing ring network 250 of FIG. 5. The self healing ring network 270 also has four nodes 271–274, a working ring 275 and a protection ring 276. The working ring 275, as in FIG. 5, comprises one ADM 271-1, 272-1, ..., 274-1 at each node, respectively. Additionally, protection switches 277–280 are provided, which function in a similar fashion to the protection switches 257–260 of the ring network 250 (FIG. 5). However, the protection ring 276 comprises one SONET regenerator (SR) 271-2, 272-2, 273-2, and 274-2, at each node 271, 272, 273 or 274, respectively, rather than an additional ADM. A SONET regenerator, like an ADM, receives a SONET signal and regenerates the signal for output. The SONET regenerator, however, cannot terminate received data. Thus data received on the protection ring 276 (e.g., at the SONET regenerator 271-2 of the node 271) must be transmitted across the protection switch (e.g., protection switch 277) to the ADM (e.g., ADM 271-1) at the node (e.g., node 271) in order to be terminated. The operation of the second self healing ring network 270 is otherwise identical with the first self healing ring network 250 (FIG. 5).

Finally, a third prior art self healing ring network 290 is shown in FIG. 7. The ring network 290 has four nodes 291–294, a working ring 295 and a protection ring 296. Instead of two distinct ADMs at each node 291–294 (one for the working ring 295 and one for the protection ring 296), a 1+1 ADM 297, 298, 299 and 300 is provided at each node 291–294, respectively. Each of the 1+1 ADMs 297, 298, 299 or 300 is actually two ADMs which share common software and control circuits. The operation of the 1+1 ADM is otherwise very similar to the pair of ADMs (e.g., the ADMs 251-1 and 251-2 of FIG. 5) connected by a protection switch (e.g., the protection switch 257 of FIG. 5) described above. In other words, data received at a node from one ring can be rerouted to the other ring via the 1+1 ADM at that node.

It may be appreciated that in each of the self healing ring networks described above, the protection rings are active and require additional electronic equipment to be installed at each node. This is disadvantageous because the electronic components are very expensive. Thus, the cost of the protection rings is at least half the total cost of the ring network. The prior art self healing ring network of FIG. 6 which utilizes SONET regenerators has another disadvantage in that the SONET regenerators cannot terminate data propagating on the protection ring. Without extra control equipment for terminating protection switching messages (i.e., the K1 and K2 bytes), this prior art ring network cannot operate according to SONET protection switching protocols. Finally, the prior art self healing ring network of FIG. 7 which utilizes 1+1 ADMs also has a an additional disadvantage, i.e., no protection capability is provided if the common equipment of a 1+1 ADM at a node fails.

It is therefore the object of the present invention to provide a self healing ring network which overcomes the disadvantages of the prior art. In particular, it is an object of the present invention to provide a self healing ring network with a passive protection ring, i.e., a protection ring not involving the use of active electronic equipment inside the nodes. It is a further object of the invention to provide a self healing ring network with a protection ring which may be installed without modifying or altering the electronic equipment contained in the nodes, and need not be changed when the network is upgraded to support a higher line transmission rate.

SUMMARY OF THE INVENTION

The present invention is directed to a passive-protected optical fiber ring network. The ring network comprises a plurality of active electronic nodes interconnected by optical fibers into a working ring. The ring network also includes a passive optical fiber protection ring. The passive protection ring interfaces with the working ring through a small number of optical switches located at each node. In the event of a failure (e.g., a failed fiber, groups of fibers, or a failed node), the optical switches are set to interconnect the passive protection ring to the nodes on either side of the failure. The optical switches are set so that the optical fiber protection ring bypasses the other nodes. Optical signals propagating in the working ring thus enter the protection ring at a node on one side of the failure, avoid the failure by propagating in the protection ring, and reenter the working ring at the node on the other side of the failure.

It is a particular advantage of the present invention that the protection ring may be installed without modifying or adding to the active electronic equipment in the nodes. Thus the protection ring may be installed at a minimum cost, and need not be changed when the ring network is upgraded to support a higher line transmission rate.

The ring network may include additional pairs of working and protection rings and the optical switches at each node may be configured to achieve loopback or span protection switching.

BRIEF DESCRIPTION OF THE DRAWINGS

FIG. 5 depicts a first prior art self healing ring network architecture.

FIG. 6 depicts a second prior art self healing ring network architecture.

FIG. 7 depicts a third prior art self healing ring network architecture.

DETAILED DESCRIPTION OF THE INVENTION

Figure 1:
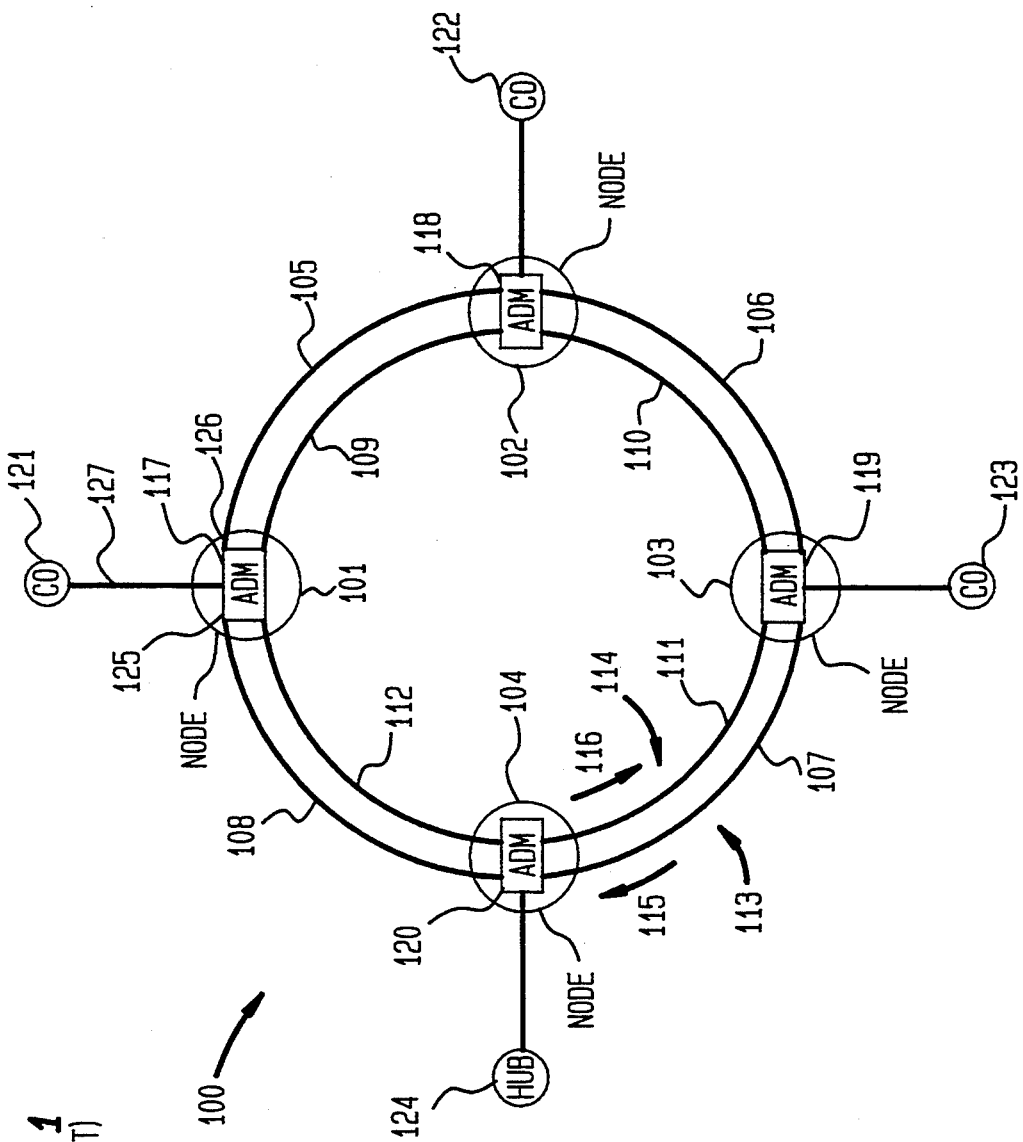
FIG. 1 depicts a prior art ring network.
Figure 2:
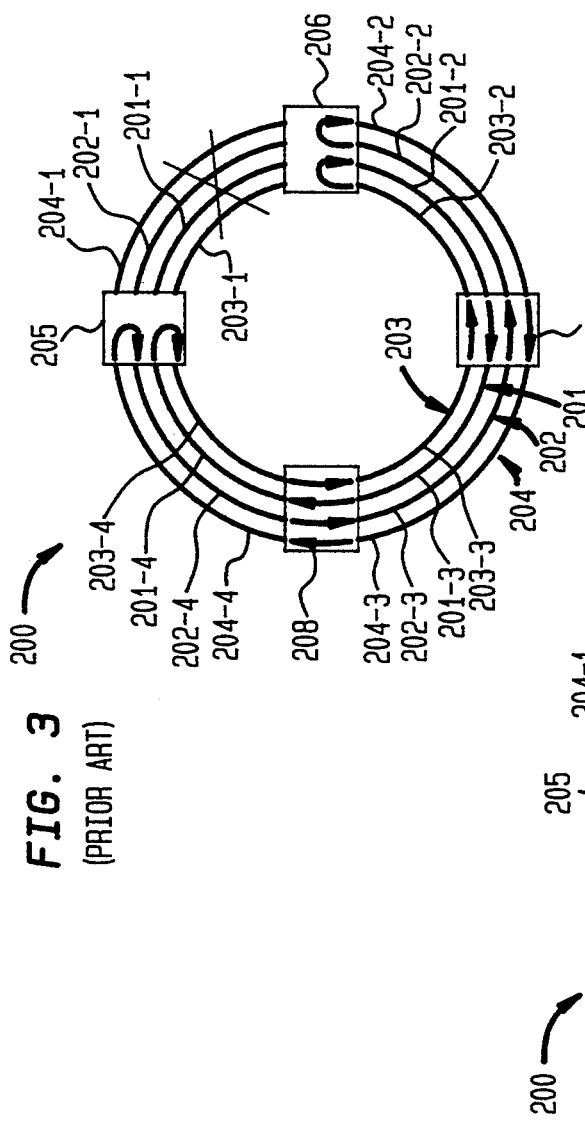
FIG. 2 depicts a prior art ring network with protection rings.
Figure 4:
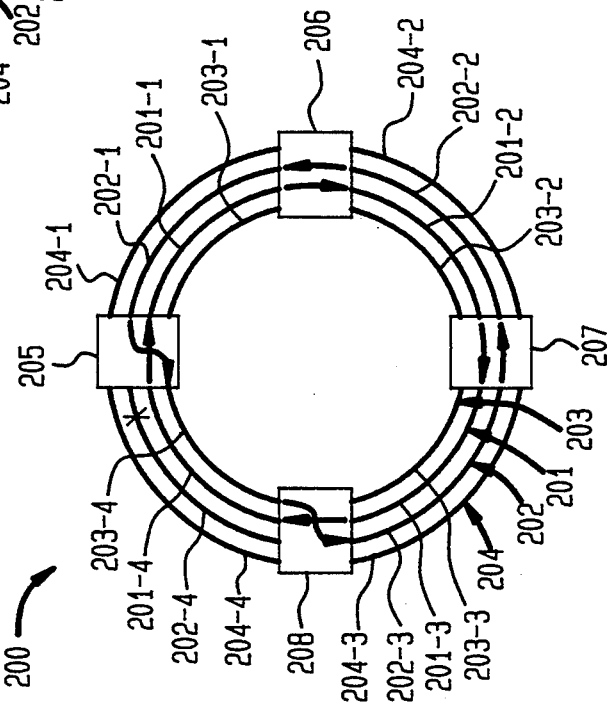
FIG. 4 depicts the prior art ring network of FIG. 2 performing span protection switching.
Figure 3:
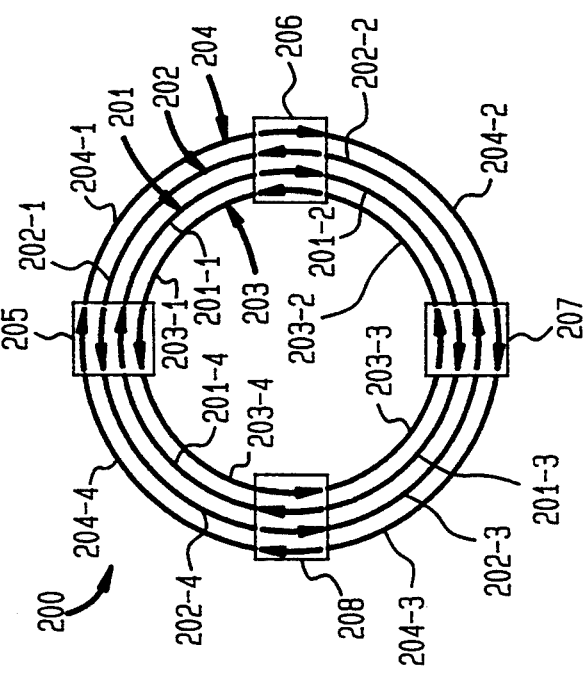
FIG. 3 depicts the prior art ring network of FIG. 2 performing loopback protection switching.
Figure 8:
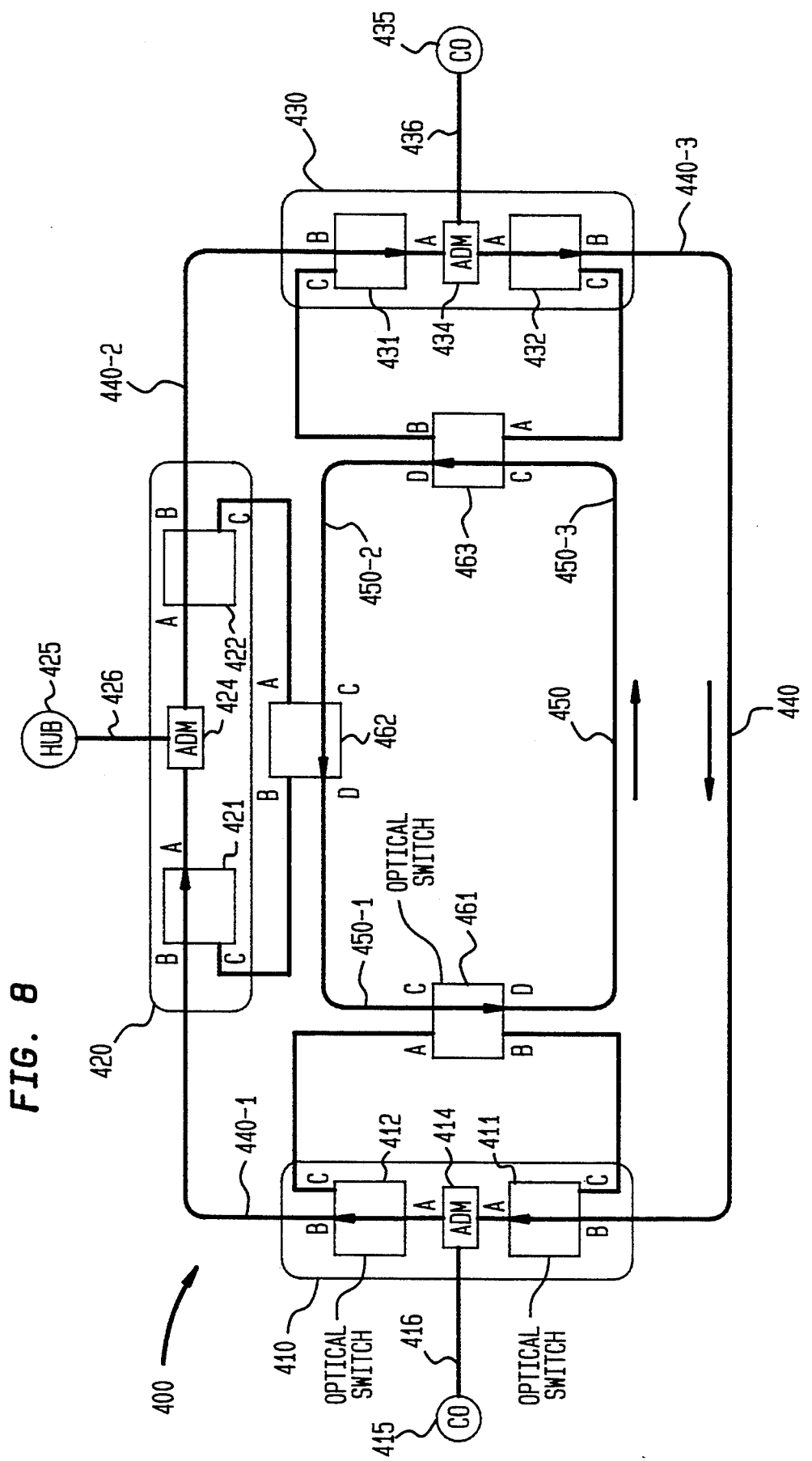
FIG. 8 depicts a passive protected self healing ring network according to a first embodiment of the invention.

Referring now to FIG. 8, a passive protected self healing ring network 400 according to one embodiment of the present invention is shown. The ring network 400 has a working ring 440 which comprises the optical fibers 440-1, 440-2 and 440-3 and the nodes 410, 420 and 430. Illustratively, data propagates around the working ring 440 in a clockwise direction. The working ring 440 also illustratively comprises the working optical switches 411 and 412 at the node 410, the working optical switches 421 and 422 at the node 420, and the working optical switches 431 and 432 at the node 430. The interconnections of these switches are discussed in detail below.

Each node 410, 420 and 430 illustratively includes an ADM 414, 424 and 434, respectively. Each ADM 414, 424 and 434 receives the frames of a SONET optical signal propagating on the working ring 440 and regenerates the received frames for output thereon. For example, frames received from the optical fiber 440-3 at the ADM 414 are regenerated onto the optical fiber 440-1. The ADMs 414 and 434 are shown connected to a central office (CO) 415 and 435 by a communications link (COM LINK) 416 and 436, respectively. Similarly, the ADM 424 is shown connected to a hub 425 by the communications link 426. By means of these communications links 416, 426 or 436, data may be transmitted between a central office or hub 415, 425 or 435 and a respective ADM 414, 424 or 434.

The ring network 400 also has a protection ring 450 which comprises the optical fibers 450-1, 450-2 and 450-3 and the protection optical switches 461, 462, 463. Illustratively, data propagates around the protection ring 450 in a counter clockwise direction.

The optical switches 411, 412, 421, 422, 431, 432, 461, 462 and 463 of the ring network 400 are preferably mechanical optical switches which may be electronically controlled although electro-optical switches, e.g., LiNbO3 switches, may be used. The optical switches 411, 412 and 461 are connected together in an analogous fashion to the three optical switches 421, 422 and 462 and the three optical switches 431, 432 and 463. As such, only the interconnection and operation of the switches 411, 412 and 461 are discussed below.

The optical switch 461 has two inputs 461(A) and 461(C) and two outputs 461(B) and 461(D). The input 461(A) and the output 461(B) are respectively connected to the optical switches 412 and 411 as described below. The input 461(C) is connected to the optical fiber 450-1. The output 461(D) is connected to the optical fiber 450-3. Thus, by way of the input 461(C) and the output 461(D), the optical switch 461 is connected to the protection ring 450.

The optical switch 411 has one output 411(A) connected to the ADM 414 and two inputs 411(B) and 411(C). The input 411(B) is connected to the optical fiber 440-3 of the working ring 440. The input 411(C) is connected to the output 461(B) of the optical switch 461 and thus is connected to the protection ring 450. The optical switch 412 has one input 412(A) connected to the ADM 414 and two outputs 412(B) and 412(C). The output 412(B) is connected to the optical fiber 440-1 of the working ring 440. The output 412(C) is connected to the input 461(A) of the optical switch 461 and thus is connected to the protection ring 450.

Each of the optical switches 411, 412 and 461 illustratively has two states. The optical switch 461 has a bypass state in which the input 461(C) is connected to the output 461(D). In this state, the protection ring 450 bypasses the node 410. The optical switch 461 also has an interconnection state in which the input 461(C) is connected to the output 461(B) and the input 461(A) is connected to the output 461(D). In this state, the protection ring 450 is connected to the node 410 and thus to the working ring 440.

The optical switch 411 has a normal state in which the input 411(B) is connected to the output 411(A). In this state, optical signals propagating on the working ring 440 are connected into the ADM 414. The optical switch 411 also has a protection state in which the input 411(C) is connected to the output 411(A). In this state, optical signals propagating on the protection ring 450 are connected, via the optical switch 461, to the ADM 414. Similarly, the optical switch 412 has a normal and a protection state. In the normal state, the input 412(A) is connected to the output 412(B) thereby connecting optical signals outputted by the ADM 414 to the working ring 440. In the protection state, the input 412(A) is connected to the output 412(C) thereby connecting optical signals outputted by the ADM 414 to the protection ring 450 via the optical switch 461. It may be appreciated that the optical switches 411–412 may be operated independently of one another. However, these optical switches 411–412 are illustratively not operated in their protection states unless the protection ring 450 is connected to the node 410, i.e., unless the optical switch 461 operates in its interconnection state.

As indicated above, the optical switches 462 and 463 have the same possible states as the optical switch 461. Similarly, the optical switches 421 and 431 have the same possible states as the optical switch 411 and the optical switches 422 and 432 have the same possible states as the optical switch 412. The possible states are summarized in the following chart:

| Switch | State | Connection |
| --- | --- | --- |
| 461, 462, 463 | bypass | C→D |
|  | interconnection | C→B, A→D |
| 411, 421, 431 | normal | B→A |
|  | protection | C→A |
| 412, 422, 432 | normal | A→B |
|  | protection | A→C |

As depicted in FIG. 8, no failures, such as failed nodes or optical fibers, exist in the network 400. As such, data propagates around the working ring 440 from node to node. Illustratively, data is transmitted by the nodes according to the SONET signal hierarchy. In such a case, a SONET optical signal circulates around the working ring 440. Each node (e.g., the node 410) receives the frames of this SONET signal from an immediately upstream node (e.g., the node 430) and regenerates the frames for output to the next downstream node (e.g., the node 420) on the working ring 440. The nodes may communicate with one another by reading data from, or writing data into, different time slots of the frames. Illustratively, a node only reads data from a time slot designated for reception by that node. If the data is destined for another node, it is merely regenerated. For example, suppose it is desired to transmit data from the central office 415 to the central office 435. Under normal circumstances, the data traverses the following path:

CO 415→COM LINK 416→ADM 414→switch 412 input 412(A)→switch 412 output 412(B)→optical fiber 440-1→switch 421 input 421(B)→switch 421 output 421(A)→ADM 424→switch 422 input 422(A)→switch 422 output 422(B)→optical fiber 440-2→switch 431 input 431(B)→switch 431 output 431(A)→ADM 434→COM LINK 436→CO 435

Figure 9:
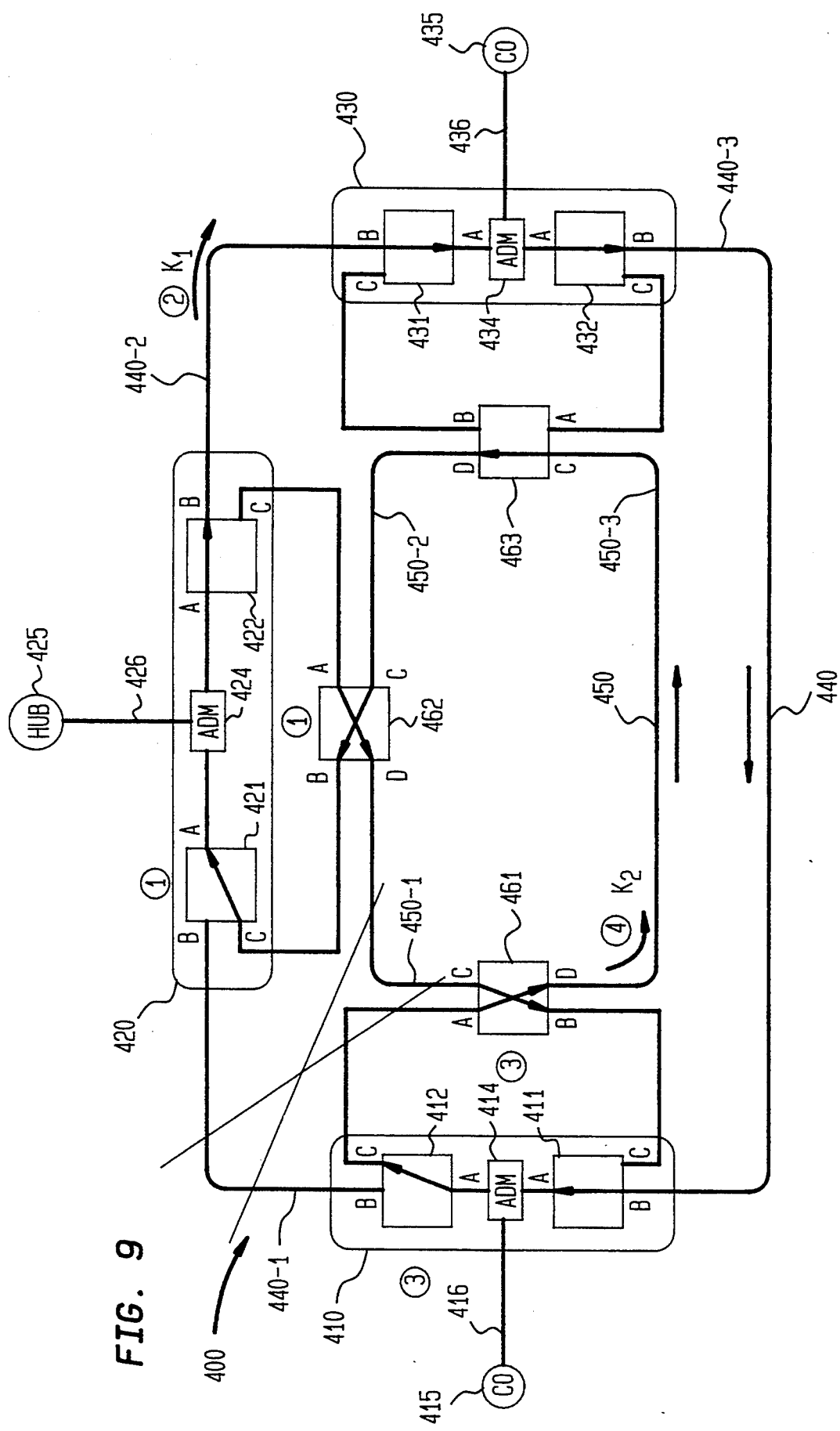
FIG. 9 illustrates the operation of the ring network of FIG. 8 in the event of a cable cut failure.

The ring network 400 may also automatically maintain operations in the event of a failure. Turning now to FIG. 9, the ring network 400 is depicted operating in the event of a cable cut failure depicted by an "X". As depicted, both of the optical fibers 440-1 and 450-1 have failed. Also as depicted, the optical switches 461 and 462 are set to their interconnection states and the optical switches 412 and 421 are set to their protection states. The optical switch 463 is set to its bypass state and the optical switches 411, 422, 431 and 432 are set to their normal states. Illustratively, the ring network 400 automatically sets the states of these optical switches to the states depicted in FIG. 9 upon detecting a failure. This procedure is now discussed.

One or more nodes of the network may illustratively detect that a failure, such as the cable cut failure depicted in FIG. 9, has occurred. For example, the node 420 may detect a loss of signal on the optical fiber 440-1. In response to detecting the failure, the node 420 illustratively first sets the optical switch 421 to its protection state and the optical switch 462 to its interconnection state. This is indicated in FIG. 9 by the label 1.

Next, the node 420 requests protection switching at the node immediately upstream therefrom on the working ring 440 (i.e., the node 410). This is achieved by transmitting a protection switching request message from the node 420 to the upstream node 410. Illustratively, the request message is generated according to a SONET protection switching protocol. To that end, the ADM 424 transmits a particular value in the K1 line overhead byte to the node 410. This is depicted by the label 2 in FIG. 9.

This request message propagates around the working ring 440 until it reaches the node 410. Upon receiving the request message, the node 410 sets the optical switch 461 to its interconnection state and the optical switch 412 to its protection state. This is indicated in FIG. 9 by the label 3. Thereafter, the ADM 414 transmits a confirmation message back to the node 420. In accordance with SONET protection switching protocols, a particular value is written into the K2 byte and transmitted back to the node 420. This is depicted in FIG. 9 by the label 4.

The confirmation message propagates on the protection ring 450 to the node 420. As will be discussed below, the confirmation message is used to distinguish a cable cut failure from a node failure.

With the optical switches 412 and 461 in their protection and interconnection states, respectively, as depicted in FIG. 9, data propagating on the working ring 440, which is received at the node 410, is rerouted to the protection ring 450. The data then propagates in a counter clockwise direction on the protection ring 450, through the optical switch 463, which is in the bypass state, back to the node 420. Upon reaching the node 420, the data is routed back to the working ring via the optical switches 462 and 421. Thus, using a loopback protection switching scheme, operations are restored in the ring network 400. For example, data may be transmitted from the central office 415 to the central office 435 via the following path:

CO 415→COM LINK 416→ADM 414→switch 412 input 412(A)→switch 412 output 412(C)→switch 461 input 461(A)→switch 461 output 461(D)→optical fiber 450-3→switch 463 input 463(C)→switch 463 output 463(D)→optical fiber 450-2→switch 462 input 462(C)→switch 462 output 462(B)→switch 421 input 421(C)→switch 421 output 421(A)→ADM 424→switch 422 input 422(A)→switch 422 output 422(B)→optical fiber 440-2→switch 431 input 431(B)→switch 431 output 431(A)→ADM 434→COM LINK 436→CO 435

It may be appreciated that the protection ring 450 is connected only to the two nodes 420 and 410 adjacent to each side of the failure. The node 430 is completely bypassed by the protection ring 450.

Figure 10:
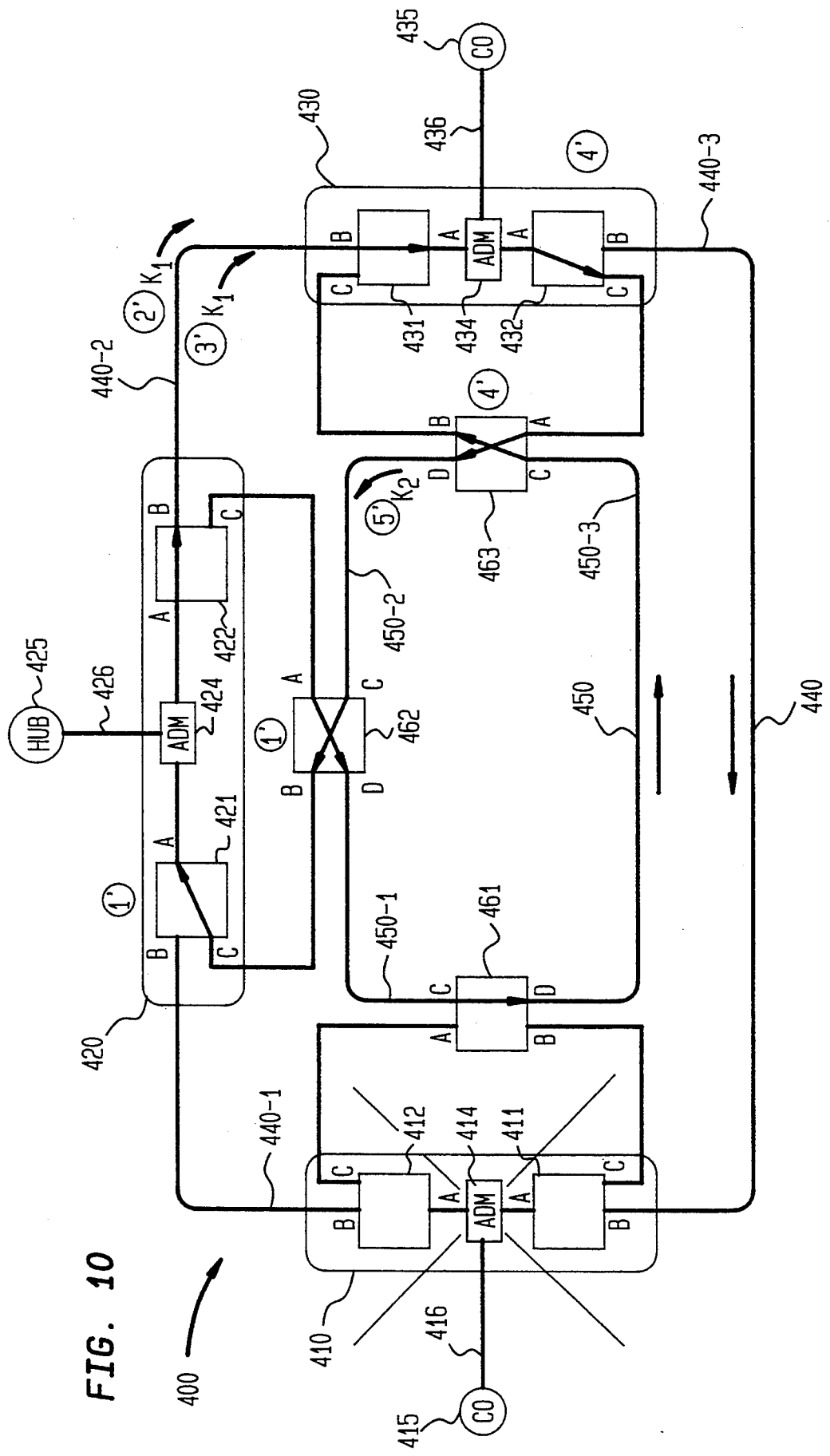
FIG. 10 illustrates the operation of the ring network of FIG. 8 in the event of a node failure.

Referring now to FIG. 10, the ring network 400 is shown with a failed node (i.e., the node 410) depicted by a large "X". The optical switches 421 and 432 are shown operating in their protection states and the optical switches 462 and 463 are shown operating in their interconnection states. The remaining optical switches 461, 411, 412,422 and 431 are shown in their bypass or normal states. Thus, as described in greater detail below, the failure (i.e., the failed node 410) is avoided and operations are maintained on the ring network 400.

The protection switching steps carried out in the event of a node failure are illustratively slightly different from the protection switching steps carried out in the event of a cable cut failure. Illustratively, the node 420 detects a loss of signal on the optical fiber 440-1, as before. However, the node 420 has no way to distinguish a cable cut failure from a node failure at this point. Hence, the node 420 performs steps 1' and 2' similar to the first two steps 1 and 2 (FIG. 9) as described above. Thus, the states of the optical switches 421 and 462 are set to their protection and interconnection states, respectively, as depicted by 1'. Thereafter, the node 420 attempts to transmit a protection switching request message (e.g., the K1 byte) to the node 410 as depicted by 2'.

As the K1 byte propagates around the working ring 440, the node 420 waits for a confirmation message (e.g., the K2 byte). However, because the node 410 has failed, no confirmation message is received. Illustratively, the node 420 only waits a fixed period of time for a response. If no confirmation message is received within that time period, the node 420 presumes that the node 410 has failed.

Once it is determined that the node 410 has failed, the node 420 transmits a protection switching request message to the node which is immediately upstream from the failed node on the working ring 440, in this case, the node 430. Illustratively, as depicted by the label 3', the same K1 byte is transmitted to the node 430. Upon receiving the protection switching request message, the node 430 performs similar protection switching as performed by the node 410 to avoid the cable cut failure (FIG. 9). Thus, as indicated by the label 4', the optical switch 463 is set to its interconnection state and the optical switch 432 it set to its protection state. Thereafter, the K2 byte is transmitted from node 430 to node 410 as indicated by the label 5'. Again, a loopback switching scheme is used to restore operations in the ring network 400. For instance, data transmitted from the hub 425 to the central office 435 traverses the path:

HUB 425→COM LINK 426→ADM 424→switch 422 input 422(A)→switch 422 output 422(B)→optical fiber 440-2→switch 431 input 431(B)→switch 431 output 431(A)→ADM 434→COM LINK 436→CO 435

Data transmitted from the central office 435 to the hub 425, however, traverses the path:

CO 435→COM LINK 436→ADM 434→switch 432 input 432(A)→switch 432 output 432(C)→switch 463 input 463(A)→switch 463 output 463(D)→optical fiber 450-2→switch 462 input 462(C)→switch 462 output 462(B)→switch 421 input 421(C)→switch 421 output 421(A)→ADM 424→COM LINK 426→HUB 425.

Figure 11:
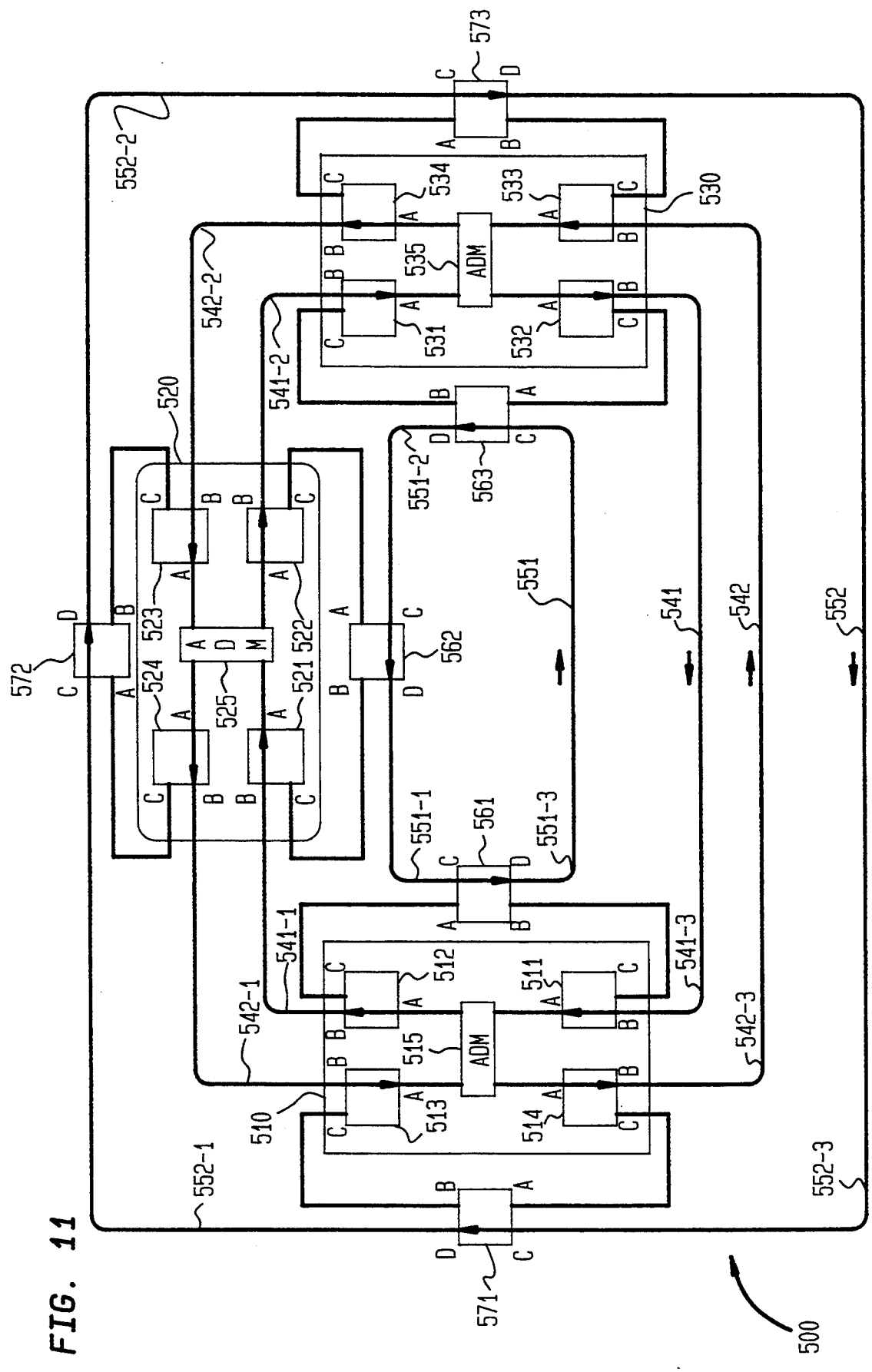
FIG. 11 depicts a passive protected self healing ring network according to a second embodiment of the invention.

Referring now to FIG. 11, a second embodiment 500 of a self healing network according to the present invention is depicted. The ring network 500 has two working rings 541 and 542 and two protection rings 551 and 552. As depicted, data propagates around the working ring 541 and the protection ring 552 in a clockwise direction. Also as depicted, data propagates around the working ring 542 and the protection ring 551 in a counter clockwise direction. For purposes of clarity, no central offices or hubs are shown, however, they can be connected in the same manner as shown in FIGS. 8–10.

In a fashion similar to the working ring 440 of FIG. 8, the working ring 541 comprises the nodes 510, 520 and 530 linked by the optical fibers 541-1, 541-2 and 541-3. Similarly, the working ring 542 comprises the nodes 510, 520 and 530 linked by the optical fibers 542-1, 542-2 and 542-3. Furthermore, each node 510, 520 and 530 also illustratively comprises one ADM 515, 525 or 535, respectively. Each node 510, 520 or 530 also comprises four working optical switches, i.e., the node 510 comprises the working optical switches 511, 512, 513 and 514, the node 520 comprises the working optical switches 521, 522, 523 and 524 and the node 530 comprises the working optical switches 531, 532, 533 and 534. In an analogous fashion to the protection ring 450 of FIG. 8, the protection ring 551 comprises the protection optical switches 561, 562 and 563 linked together by the optical fibers 551-1, 551-2 and 551-3. Each optical switch 561, 562 or 563 is associated with a different node 510, 520 or 530. Similarly, the protection ring 552 comprises the protection optical switches 571, 572 and 573 linked together by the optical fibers 552-1, 552-2 and 552-3. Again, each optical switch 571, 572 or 573 is associated with a different node 510, 520 or 530.

The interconnections of the working rings 541 and 542, the protection rings 551 and 552 and the optical switches 511–514, 561 and 571 associated with the node 510 are now described in greater detail. It may be appreciated that the optical switches 511–514, 561 and 571 associated with the node 510 are connected in a similar fashion to the optical switches 521–524, 562 and 572 associated with the node 520 and the optical switches 531–534, 563 and 573 associated with the node 530. Thus, the discussion of the interconnections at node 510 applies in an analogous fashion to the nodes 520 and 530.

The optical switch 561 has two inputs 561(A) and 561(C) and two outputs 561(B) and 561(D). The connections of the input 561(A) and the output 561(B) of the switch 561 to the optical switches 512 and 511, respectively, are described below. The input 561(C) is connected to the optical fiber 551-1 and the output 561(D) is connected to the optical fiber 551-3.

The node 510 illustratively has two optical switches 511 and 512 associated with the working ring 541 and two optical switches 513 and 514 associated with the working ring 542. The optical switch 511 has an output 511(A) connected to the ADM 515 and two inputs 511(B) and 511(C). The input 511(B) is connected to the optical fiber 541-3 and the input 511(C) is connected to the output 561(B) of the optical switch 561. The optical switch 512 has an input 512(A) connected to the ADM 515 and two outputs 512(B) and 512(C). The output 512(B) is connected to the optical fiber 541-1 and the output 512(C) is connected to the input 561(A) of the optical switch 561.

The optical switches 513, 514 and 571 are connected in an analogous fashion to the optical switches 511, 512 and 561, respectively. The optical switch 571 has two inputs 571(A) and 571(C) and two outputs 571(B) and 571(D). The input 571(A) and the output 571(B) are respectively connected to the optical switches 514 and 513 as described below. The input 571(C) is connected to the optical fiber 552-3 and the output 571(D) is connected to the optical fiber 552-1.

The optical switch 513 has an output 513(A) connected to the ADM 515 and two inputs 513(B) and 513(C). The input 513(B) is connected to the optical fiber 542-1 and the input 513(C) is connected to the output 571(B) of the optical switch 571. The optical switch 514 has an input 514(A) connected to the ADM 515 and two outputs 514(B) and 514(C). The output 514(B) is connected to the optical fiber 542-3 and the output 514(C) is connected to the input 571(A) of the optical switch 571.

The operation of the optical switches 511–514, 561 and 571 is now discussed. The discussion holds for the optical switches 521–524, 562 and 572 or 531–534, 563 and 573 which operate in an analogous fashion.

The optical switches 561 and 571 each have a bypass state (as depicted) and an interconnection state. When the optical switch 561 is set to its bypass state, the input 561(C) is connected to the output 561(D). Thus, the protection ring 551 bypasses the node 510. In the interconnection state, however, the input 561(C), is connected to the output 561(B) and the input 561(A) is connected to the output 561(D). Thus, the protection ring 551 is connected to the node 510 when the optical switch 561 is set to its interconnection state. Similarly, the protection ring 552 bypasses the node 510 when the optical switch 571 is set to its bypass state, i.e., input 571(C) connected to output 571(D). In addition, the protection ring 552 is connected to the node 510 when the optical switch 571 is set to its interconnection state, i.e., input 571(C) connected to output 571(B) and input 571(A) connected to output 571(D).

Each of the optical switches 511–514 has a normal state (as depicted in FIG. 11) and a protection state. In the normal state, the input 511(B) of the optical switch 511 is connected to the output 511(A) thereby inputting optical signals propagating on the working ring 541 to the ADM 515. In the protection state, the input 511(C) is connected to the output 511(A) thereby inputting, via the optical switch 561, optical signals propagating on the protection ring 551 to the ADM 515. Similarly, in the normal state, the input 512(A) of the optical switch 512 is connected to the output 512(B) thereby outputting optical signals from the ADM 515 to the working ring 541. In the protection state, the input 512(A) is connected to the output 512(C) thereby outputting, via the optical switch 561, optical signals from the ADM 515 to the protection ring 551.

The optical switch 513 operates in an analogous fashion to the optical switch 511. In the normal state, i.e., input 513(B) connected to output 513(A), optical signals propagating on the working ring 542 are inputted to the ADM 515. In the protection state, i.e., input 513(C) connected to the output 513(A), optical signals propagating on the protection ring 552 are inputted, via the optical switch 571, to the ADM 515. Similarly, the optical switch 514 operates in an analogous fashion to the optical switch 512. In the normal state, i.e., input 514(A) connected to output 514(B), optical signals are outputted from the ADM 515 to the working ring 542. In the protection state, i.e., input 514(A) connected to output 514(C), optical signals are outputted, via the optical switch 571, to the protection ring 552.

As with the ring network 400 (FIG. 8), each optical switch 511-514 may operate independently. However, the optical switches 511 and 512 illustratively are not set to their protection states unless the optical switch 561 is set to its interconnection state (i.e., connects the protection ring 551 to the node 510). Similarly, the optical switches 513 and 514 illustratively are not set to their protection states unless the optical switch 571 is set to its interconnection state (i.e., connects the protection ring 552 to the node 510).

As indicated above, the optical switches 562 and 563 have the same possible states as the optical switch 561 and the optical switches 572 and 573 have the same optical states as the optical switch 571. Similarly, the optical switches 521 and 531 have the same states as the optical switch 511 and the optical switches 522 and 532 have the same states as the optical switch 512. Finally, the optical switches 523 and 533 have the same states as the optical switch 513 and the optical switches 524 and 534 have the same states as the optical switch 514. The possible states are summarized in the following chart:

| Switch | State | Connection |
|---|---|---|
| 561, 562, 563, 571, 572, 573 | bypass interconnection | C→D C→B, A→D |
| 511, 521, 531, 513, 523, 533 | normal protection | B→A C→A |
| 512, 522, 532, 514, 524, 534 | normal protection | A→B A→C |

The operation of the ring network 500 is now discussed. Preferably, data propagates around the working ring 541 and the working ring 542 in opposite directions. Furthermore, if a duplex channel is established between two nodes of the ring network, the data of each channel is preferably transmitted from its originating node on a different working ring 541 or 542. For example, suppose a duplex channel is established between the node 510 and the node 530. Data originating at the node 510 illustratively traverses the path:

ADM 515→switch 512 input 512 (A)→switch 512 output 512(B)→optical fiber 541-1→switch 521 input 521(B)→switch 521 output 521(A)→ADM 525→switch 522 input 522(A)→switch 522 output 522(B)→optical fiber 541-2→switch 531 input 531(B)→switch 531 output 531(A)→ADM 535

In such a case, data originating at the node 530 preferably traverses the following path:

ADM 535→switch 534 input 534(A)→switch 534 output 534(B)→optical fiber 542-2→switch 523 input 523(B)→switch 523 output 523(A)→ADM 525→switch 524 input 524(A)→switch 524 output 524(B)→optical fiber 542-1→switch 513 input 513(B)→switch 513 output 513(A)→ADM 515

According to this preferred mode of data propagation, the data of each channel of a duplex channel propagates through the same nodes either in the order 510, 520, 530 or in the reverse order 530, 520, 510. Such a self healing network, in which the data of each channel of a duplex channel propagates through the same nodes but in opposite directions (when no failures exist in the network), is called a bidirectional self healing ring network.

Figure 12:
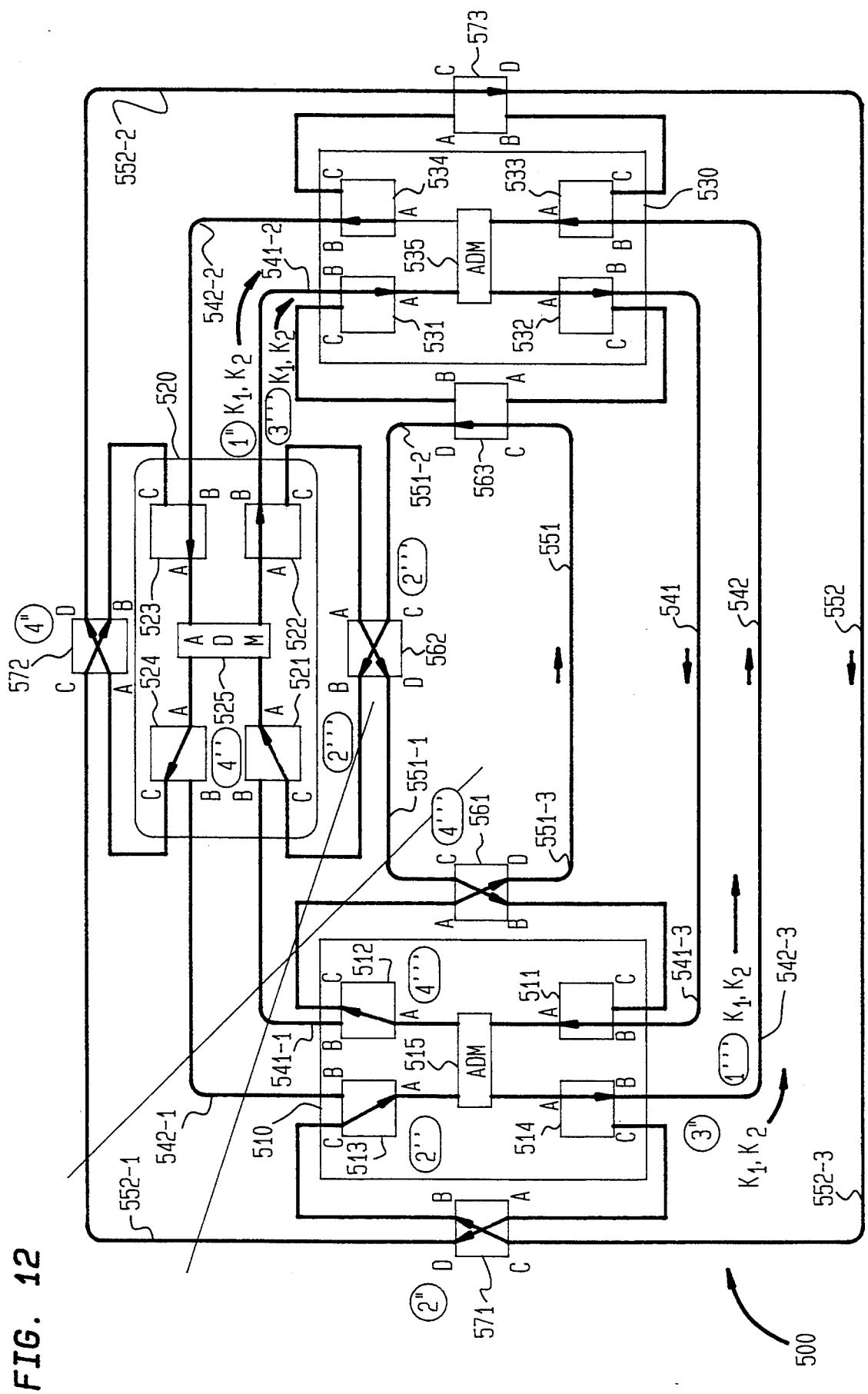
FIG. 12 illustrates the operation of the ring network of FIG. 11 in the event of a cable cut failure.

Referring now to FIG. 12, the automatic switching and operation of the ring network, in the event of a failure, is described. As depicted, a cable cut failure between the nodes 510 and 520 has occurred. Illustratively, protection switching in the ring network 500 is performed in accordance with SONET protection switching protocols.

Illustratively, the node 520 detects a failure by detecting a loss of signal on the optical fiber 541-1. Similarly, the node 510 detects a failure by detecting a loss of signal on the optical fiber 542-1. In response to the former event, the protection switching steps 1″, 2″, 3″ and 4″ are illustratively performed. Similarly, in response to the latter event, the protection switching steps 1′″, 2′″, 3′″ and 4′″ are illustratively performed. Illustratively, both nodes 510 and 520 detect a loss of signal in the event of a cable cut failure. Thus, both sequences of steps 1″-4″ and 1′″-4′″ are illustratively performed. These steps are now described.

Upon detecting a loss of signal at the node 520, a protection switching request message, which illustratively comprises the K1 and K2 line overhead bytes, is transmitted to the node 510 (which node is immediately upstream from the node 520 on the working ring 541). This is indicated by 1″. The protection switching request message propagates around the working ring 541 to the node 510. Upon receiving this message, the node 510 sets the optical switch 513 to its protection state and the optical switch 571 to its interconnection state. This is indicated by 2″. Thereafter, the node 510 illustratively transmits a confirmation message (K2 byte) and a protection switching request message (K1 byte) to the node 510 as indicated by 3″. These messages propagate back to the node 510 via the working ring 542. Upon receiving the protection switching request and confirmation messages, the node 520 sets the optical switch 524 to its protection state and the optical switch 572 to its interconnection state as depicted by 4″.

The steps 1′″-4′″ executed when the node 510 detects a loss of signal on the optical fiber 542-1 are similar to the steps 1″-4″. Upon detecting a loss of signal at the node 510, a protection switching request message, which illustratively comprises the K1 and K2 line overhead bytes, is transmitted to the node 520 (which node is immediately upstream from the node 510 on the working ring 542). This is indicated by 1′″. The protection switching request message propagates around the working ring 542 to the node 520. Upon receiving protection switching request message, the node 520 sets the optical switch 521 to its protection state and the optical switch 562 to its interconnection state as depicted by 2'''. Thereafter, the node 520 transmits a confirmation message (which illustratively comprises the K2 byte) and a protection switching request message (which illustratively comprises the K1 byte) to the node 510 as depicted by 3'''. These messages propagate on the working ring 541 to the node 510. Upon receiving the protection switching request and confirmation messages, the node 510 sets the optical switch 512 to its protection state and the optical switch 561 to its interconnection state as depicted by 4'''.

After performing the above steps 1''''-4'''' and 1'''-4''', the operation of the ring network 500 is restored. For example, data which was formerly transmitted from the node 510 to the node 530 via the working ring 541 traverses the path:

ADM 515→switch 512 input 512 (A)→switch 512 output 512(C)→switch 561 input 561(A)→switch 561 output 561(D)→optical fiber 551-3→switch 563 input 563(C)→switch 563 output 563(D)→optical fiber 551-2→switch 562 input 562 (C)→switch 562 output 562(B)→switch 521 input 521(C)→switch 521 output 521(A)→ADM 525→switch 522 input 522(A)→switch 522 output 522 (B)→optical fiber 541-2→switch 531 input 531(B)→switch 531 output 531(A)→ADM 535

Again, the protection ring 551 is only connected to the two nodes 510 and 520 on either side of the failure. By virtue of the optical switch 563 operating in its bypass state, the protection ring 551 bypasses the node 530. Similarly, the optical switch 573 operates in its bypass state so that the protection ring 552 bypasses the node 530.

It may be appreciated that the ring network 500 may also operate in the event of a node failure. In such a case, the protection switching steps performed in the ring network 500 are very similar to the steps 1'-5' of FIG. 11. Thus, for example, if the node 510 fails, the node 520 will transmit a protection switching request message to the node 510. If no response is received within a fixed time period, the node 520 will transmit a protection switching request message to the node immediately upstream from the node 510 on the working ring 541, namely, the node 530. The node 530 will then perform steps similar to steps 2'' and 3'' and the node 520 will perform a step similar to step 4''.

Figure 13:
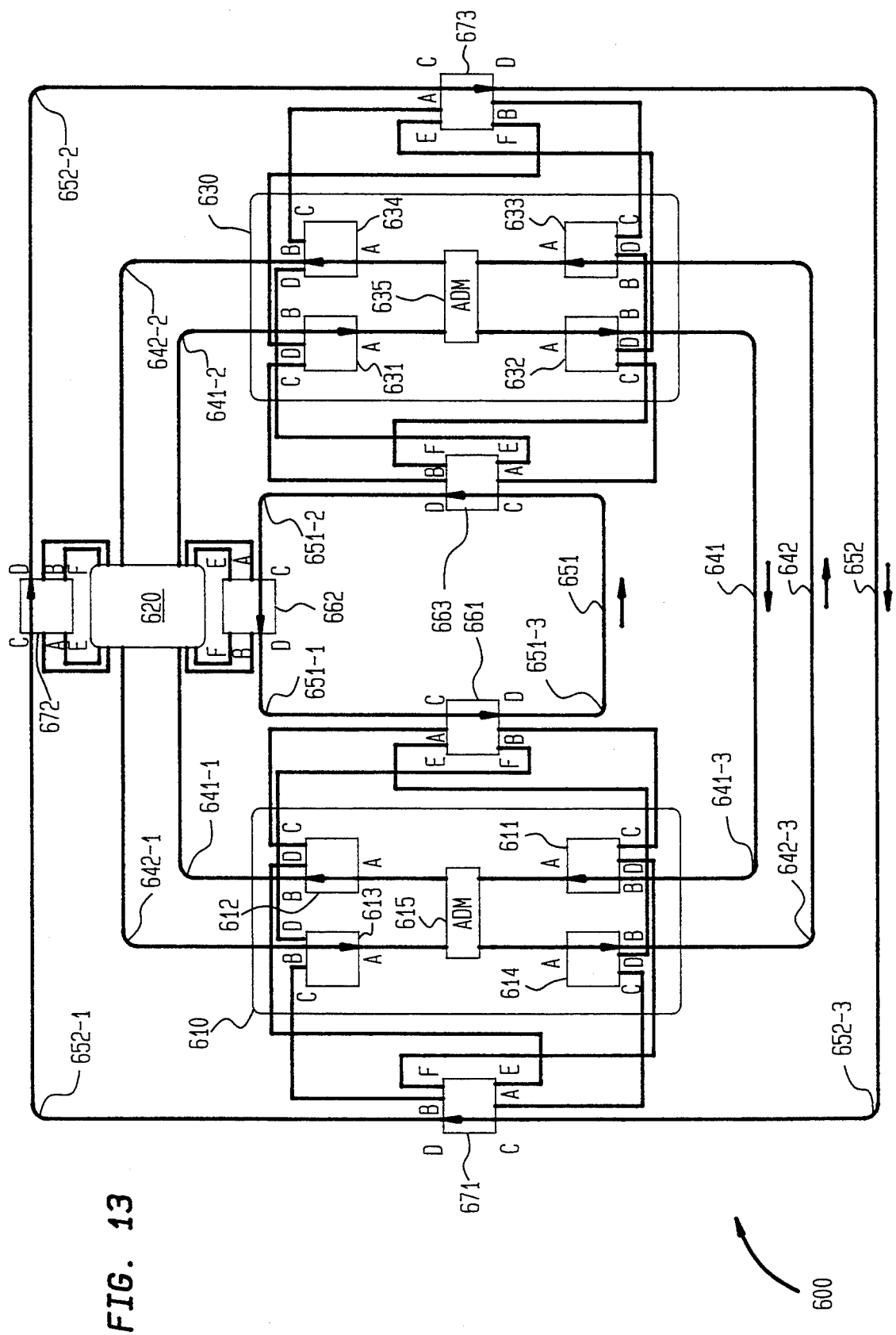
FIG. 13 depicts a variation of the passive protected self healing ring network of FIG. 11.

Referring now to FIG. 13, a variation 600 of the ring network 500 (FIG. 12) is shown which can perform span protection switching in addition to loopback protection switching. The ring network 600 may also maintain operations in the event of multiple failures. The ring network 600 comprises two working rings 641 and 642 and two protection rings 651 and 652. The working ring 641 comprises the nodes 610, 620 and 630 and the optical fibers 641-1, 641-2 and 641-3. Similarly, the working ring 642 comprises the nodes 610, 620 and 630 and the optical fibers 642-1, 642-2 and 642-3. As depicted, data propagates in a clockwise direction around the working ring 641 and in a counter clockwise direction around the working ring 642. Each node 610 and 630 is shown with an ADM 615 or 635, and optical switches 611-614 or 631-634, respectively. For purposes of convenience, the interior of the node 620 is not shown but is the same as that of the other two nodes 610 and 630.

The protection ring 651 comprises the optical switches 661-663 and the optical fibers 651-1, 651-2 and 651-3. Similarly, the protection ring 652 comprises the optical switches 671-673 and the optical fibers 652-1, 652-2 and 652-3. As depicted, data propagates in a counter clockwise direction around the protection ring 651 and in a clockwise direction around the protection ring 652.

The interconnections of the optical switches 611-614, 661 and 671 associated with the node 610 are now discussed in detail. This discussion holds for the optical switches 631, 632, 633, 634, 663 and 673 associated with the node 630 and the optical switches 662, 672 and the other optical switches (not shown) associated with the node 620 since they have similar internal connections.

The optical switches 611, 612, 613, 614, 661 and 671 correspond to the optical switches 511, 512, 513, 514, 561 and 571, respectively, of FIG. 12. The optical switch 661 has three inputs 661(A), 661(C) and 661(E) and three outputs 661(B), 661(D) and 661(F). The input 661(C) is connected to the optical fiber 651-1 and the output 661(D) is connected to the optical fiber 651-3. Similarly, the optical switch 671 had three inputs 671(A), 671(C) and 671(E) and three outputs 671(B), 671(D) and 671(F). The input 671(C) is connected to the optical fiber 652-3 and the output 671(D) is connected to the optical fiber 652-1. The remaining inputs 661 (A) , 661 (E) , 671 (A) and 671 (E) and outputs 661(B), 661(F), 671(B) and 671(F) are connected to the optical switches 611-614 as described below.

The optical switch 611 has an output 611(A) connected to the ADM 615 and three inputs 611(B), 611(C) and 611(D). The input 611(B) is connected to the optical fiber 641-3 of the working ring 641. The input 611(C) is connected to the output 661(B) of the optical switch 661 and the input 611(D) is connected to the output 671(F) of the optical switch 671. Thus, the optical switch 611 is connected to the optical switches 661 and 671 of both protection rings 651 and 652. Similarly, the optical switch 612 has an input 612(A) connected to the ADM 615 and three outputs 612(B), 612(C) and 612(D). The output 612(B) is connected to the optical fiber 641-1 of the working ring 641. The output 612(C) is connected to the input 661(A) of the optical switch 661 and the output 612(D) is connected to the input 671(E) of the optical switch 671. Thus, the optical switch 612 is also connected to the optical switches 661 and 671 of both protection rings 651 and 652.

The optical switches 613 and 614 are connected in an analogous fashion to the optical switches 611 and 612. The optical switch 613 has an output 613(A) connected to the ADM 615 and three inputs 613(B), 613(C) and 613(D). The input 613(B) is connected to the optical fiber 642-1, the input 613(C) is connected to the output 671(B) of the optical switch 671 and the input 613(D) is connected to the output 661(F) of the optical switch 661. Thus, like the optical switch 611, the optical switch 613 is connected to the optical switches 661 and 671 of both protection rings 651 and 652. Similarly, the optical switch 614 has an input 614(A) connected to the ADM 615 and three outputs 614(B), 614(C) and 614(D). The output 614(B) is connected to the optical fiber 642-3. The output 614(C) is connected to the input 671(A) and the output 614(D) is connected to the input 661(E). Thus, like the optical switch 612, the optical switch 614 is also connected to the optical switches 661 and 671 of both protection rings 651 and 652.

The operation of the optical switches 611-614, 661 and 671 associated with the node 610 is now discussed. It may be appreciated that since the internal connections of each node 610, 620 and 630 are similar, the discussion holds for the nodes 620 and 630.

The optical switches 611–614 correspond to the optical switches 511–514 of FIG. 11 and hence may operate in the same states to perform loopback protection switching. However, by virtue of having an extra input (i.e., 611(D) or 613(D)) or output (i.e., 612(D) or 614(D)), each optical switch 611, 612, 613 or 614 has an additional protection state. Thus, for example, the output 611(A) is connected to the input 611(B) while operating in the normal state, to the input 611(C) while operating in a first protection state and to the input 611(D) while operating in a second protection state. In the normal state, the optical switch 611 inputs optical signals propagating on the working ring 641 to the ADM 615. In the first protection state, the optical switch 611 inputs, via the optical switch 661, optical signals propagating on the protection ring 651 to the ADM 615. Finally, in the second protection state, the optical switch 611 inputs, via the optical switch 671, optical signals propagating on the protection ring 652 to the ADM 615. Similarly, the optical switch 612 has a normal state, i.e., input 612(A) connected to the output 612(B), a first protection state, i.e., input 612(A) connected to the output 612(C), and second protection state, i.e., input 612(A) connected to the output 612(D). In the normal state, the optical switch 612 outputs optical signals from the ADM 615 to the working ring 641. In the first protection state, the optical switch 612 outputs optical signals to the protection ring 651 via the optical switch 661. Finally, in the second protection state, the optical switch 612 outputs optical signals to the protection ring 652 via the optical switch 671.

It may be appreciated that the operation of the optical switches 613 and 614 is analogous to the operation of the optical switches 611 and 612. The optical switch 613 has a normal state, i.e., input 613(B) connected to output 613(A), a first protection state, i.e., input 613(C) connected to output 613(A), and a second protection state, i.e., input 613(D) connected to output 613(A). In the normal state, the optical switch 613 inputs optical signals propagating on the working ring 642 to the ADM 615. In the first protection state, the optical switch 613 inputs, via the optical switch 671, optical signals propagating on the protection ring 652 to the ADM 615. Finally, in the second protection state, the optical switch 613 inputs, via the optical switch 661, optical signals propagating on the protection ring 651 to the ADM 615. Similarly, the optical switch 614 has a normal state, i.e., input 614(A) connected to output 614(B), a first protection state, i.e., input 614(A) connected to output 614(C), and a second protection state, i.e., input 614(A) connected to output 614(D). In the normal state, the optical switch 614 outputs optical signals from the ADM 615 to the working ring 642. In the first protection state, the optical switch 614 outputs optical signals from the ADM 615 to the protection ring 652 via the optical switch 672. Finally, in the second protection state, the optical switch 614 outputs optical signals from the ADM 615 to the protection ring 651 via the optical switch 661. The following chart summarizes the possible states of the optical switches 611–614 at the node 610, the optical switches 631–634 at the node 630 and the optical switches (not shown) at the node 620:

| switch | state | connections |
|---|---|---|
| 611, 613, | normal | B→A |
| 631, 633 | first protection | C→A |
|  | second protection | D→A |
| 612, 614, | normal | A→B |
| 632, 634 | first protection | A→C |
|  | second protection | A→D |

The optical switches 661 and 671 correspond to the optical switches 561 and 571 (FIG. 11) and hence have the same operating states. However, the optical switches 661 and 671 have a plurality of additional interconnection states. The additional interconnection states of each optical switch 661 and 671 permit optical signals to be simultaneously transmitted between either, or both, working rings 641 and 642 and each protection ring 651 and 652. For example, the optical switch 661 has an interconnection state in which the input 661(A) is connected to the output 661(D) and in which the input 661(C) is connected to the output 661(F). In this state, optical signals are transmitted from the working ring 641 to the protection ring 651 and from the protection ring 651 to the working ring 642 at the node 610. The optical switch 661 also has an interconnection state in which the input 661(C) is connected to output 661(B) and the input 661(E) is connected to the output 661(D). In this state, optical signals are transmitted from the working ring 642 to the protection ring 651 and from the protection ring 651 to the working ring 641. Additionally, the optical switch 661 has an interconnection state in which the input 661(C) is connected to the output 661(F) and the input 661(E) is connected to the output 661(D). In this state, optical signals are transmitted between the protection ring 651 and the working ring 642. The following chart summarizes possible states of the optical switches 661 and 671:

| switch | state | connections |
|---|---|---|
| 661, 671 | bypass | C→D |
|  | interconnection | C→B, A→D |
|  | interconnection | C→B, E→D |
|  | interconnection | C→F, A→D |
|  | interconnection | C→F, E→D |

With these additional operating states, the ring network 600 may transmit optical signals between either working ring 641 or 642 (or both) and each protection ring 651 and 652 at any node 610, 620 and 630. As shown below, this enables the ring network 600 to perform span protection switching in addition to loopback protection switching.

Figure 14:
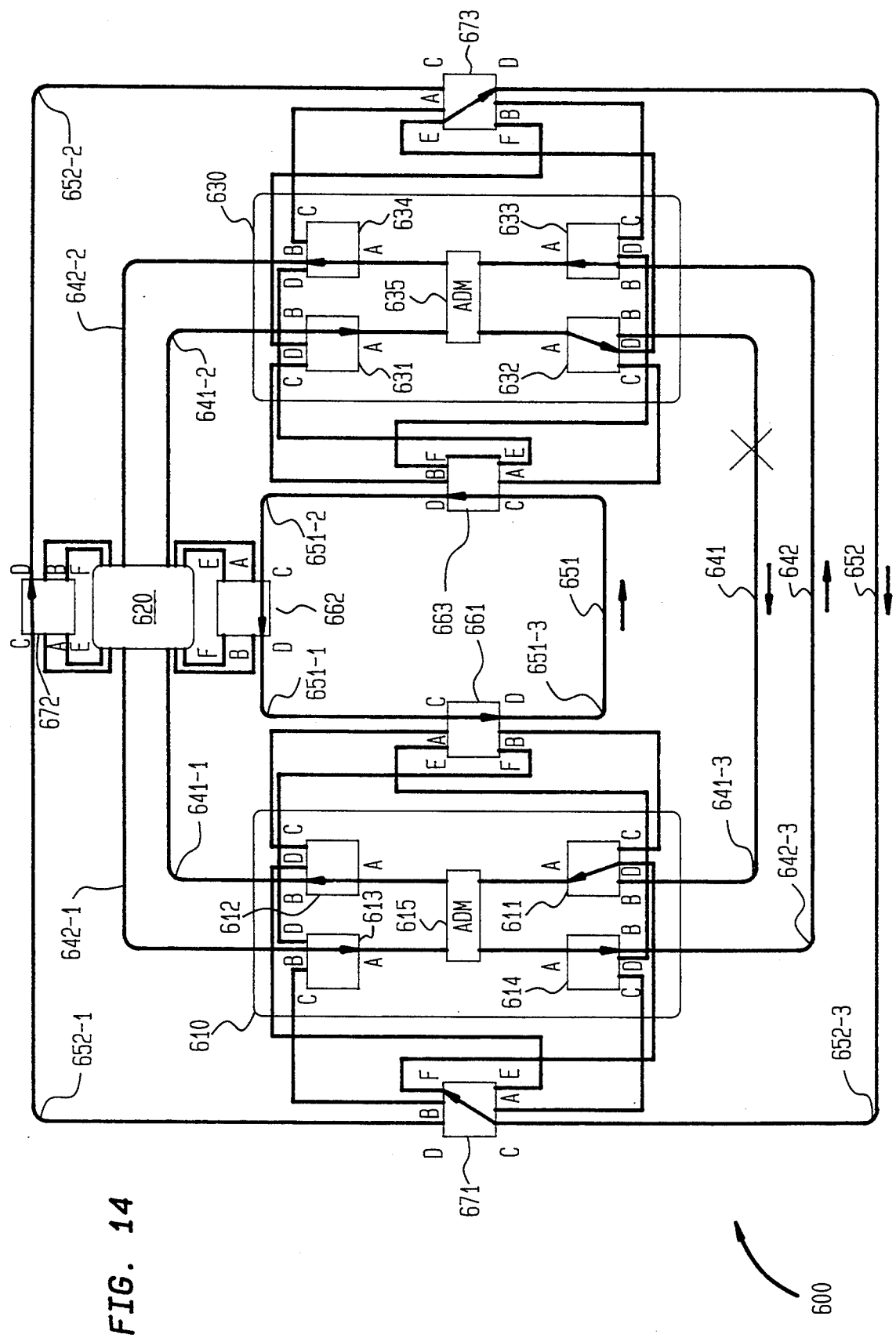
FIG. 14 depicts the operation of the ring network of FIG. 13 in the event of a fiber failure.

Referring now to FIG. 14, the ring network 600 is shown operating according to a span protection switching scheme. As depicted by an "X", the optical fiber 641-3 has failed. Illustratively, such a failure may be detected at the node 610, for example, by detecting a signal degradation or loss of signal on the optical fiber 641-3. Upon detecting a failure, protection switching may illustratively be initiated in a manner similar to described above. For example, the node 610 may transmit the K1 and K2 bytes to the node 630. In this case, however, a different value may be loaded into the K2 byte in order to specify span protection switching.

As depicted, the input 671(C) of the optical switch 671 associated with the node 610 is connected to the output 671(F). Thus, the protection ring 652 is connected to the node 610. Specifically, optical signals propagating on the optical fiber 652-3 are transmitted to the input 611(D) of the optical switch 611. The optical switch 611 operates in its second protection state whereby optical signals propagating on the protection ring 652 are inputted, via the optical switch 671, to the ADM 615. Similarly, the optical switch 673 at the node 630 is set to an interconnection state whereby its input 673(E) is connected to its output 673(D). Furthermore, the optical switch 632 at the node 630 operates in its second protection state whereby optical signals outputted by the ADM 635 are outputted to the protection ring 652, via the optical switch 673. Thus, optical signals ordinarily outputted by the ADM 635 to the optical fiber 641-3 of the working ring 641 are rerouted to the optical fiber 652-3. These optical signals propagate on the optical fiber 652-3 to the node 610 where they are routed back to the working ring 641. Data which would ordinarily be transmitted from the node 630 to the node 610 via the working ring 641 traverses the path:

ADM 635→switch 632 input 632(A)→switch 632 output 632 (D)→switch 673 input 673(E)→switch 673 output 673(D)→optical fiber 652-3→switch 671 input 671(C)→switch 671 output 671(F)→switch 611 input 611(D)→switch 611 output 611(A)→ADM 615

It may be appreciated that the protection rings in each of the aforementioned embodiments do not have any electronic components such as SONET regenerators or ADMs to regenerate optical signals propagating thereon. In the event of particular failures, optical signals may propagate over long distances prior to being received by an ADM. As an optical signal propagates on an optical fiber, it becomes attenuated. Thus, the optical signal may be too weak to be received if it is rerouted over a particularly long optical path without regeneration.

According to another embodiment of the present invention, one or more optical amplifiers may be inserted into the ring network. For instance, low gain amplifiers may be placed at particular nodes. Preferably, however, one or more high gain amplifiers are inserted into appropriate locations of the protection ring. The actual placement of the amplifiers depends on the type of amplifiers used, the maximum distance an optical signal may travel before being received and the acceptable signal loss that the receiver of each ADM will tolerate.

Preferably, high gain optical limiting amplifiers, such as disclosed in W. I. Way, T-H Wu, A. Yi-Yan and C. Lin, "Applications of Optical Power Limiting Amplifiers in Self-Healing Ring Networks," *17th European Conference on Optical Communications*, September 1991, p. 605-08, are used in ring networks according to the present invention. As disclosed in the above reference, an optical limiting amplifier may comprise one or more erbium doped optical fibers which are spliced into the optical fibers of the protection ring. Such amplifiers can provide a constant output power despite a large variation in input power. Thus, optical limiting amplifiers may amplify signals which have traveled a variety of distances (and which are therefore attenuated to different extents) to the same power level.

Illustratively, if optical limiting amplifiers are used, they are strategically positioned within the protection ring depending on the longest distance an unregenerated optical signal could potentially propagate on the protection ring. Preferably, the optical amplifiers are placed immediately before the inputs of an ADM (i.e., before the receiver of the ADM). In such a case, an optical amplifier is placed adjacent to the node which, in comparison to the other nodes, is farthest from its closest neighboring node.

Figure 15:
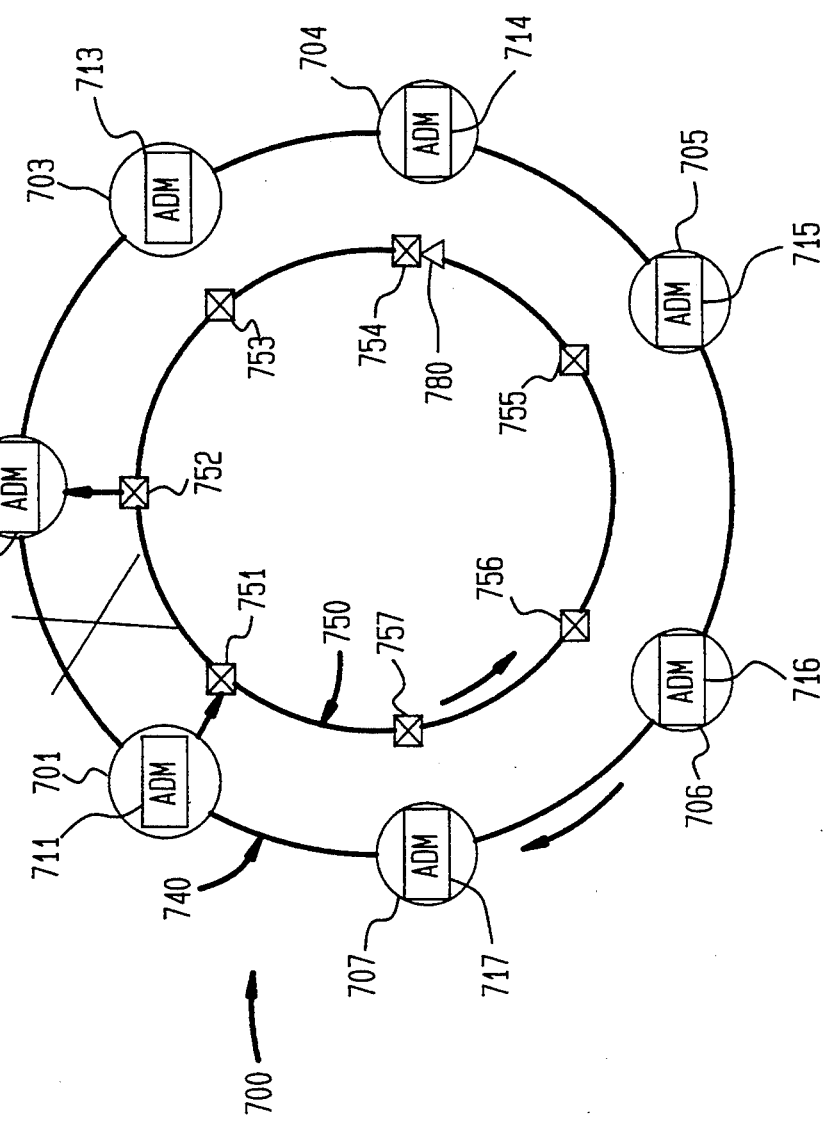
FIG. 15 depicts a passive protected self healing ring network according to the present invention with an optical amplifier.

For example, a ring network 700 is depicted in FIG. 15 having seven nodes 701-707, a working ring 740 which carries data in the clockwise direction and a protection ring 750 which carries data in the counter clockwise direction. Each node has an ADM 711-717. As depicted, the protection ring 750 has one optical switch 751-757 corresponding to each node 701-707. As depicted by an "X" in FIG. 15, a cable cut failure has occurred between the nodes 701 and 702. As such, optical signals are illustratively rerouted from the working ring 740 to the protection ring 750 via the optical switch 751. Ordinarily, these optical signals would propagate unregenerated in the counter clockwise direction along the protection ring 750 to the add drop multiplexer 712 via the optical switch 752. However, an optical limiting amplifier 780, inserted into the protection ring 750 at the node 704, amplifies the optical signals propagating on the protection ring 750. Preferably, the node 704 is located farther from its closest neighboring nodes 703 and 705 than other nodes are located from their closest neighboring nodes. Such a placement permits the distance between each adjacent node to be maximized.

Additionally, more than one optically limiting amplifier may be placed into a protection ring. Illustratively, the first amplifier is placed as described above. A second amplifier may be inserted into the protection ring at a point where the optical signals amplified by the first amplifier would have reached their greatest permissible attenuation. Other optical amplifiers may be successively placed in this fashion (i.e., third amplifier in relation to second amplifier, etc.).

In summary, a self healing ring network is disclosed which automatically maintains operations in the event of a failure. Passive protection rings are provided which are only connected to the two nodes adjacent to either side of a failure in the network. The protection rings otherwise bypass the nodes. It is a particular advantage of the passive protection rings of the present invention that they may be installed using only a small number of optical switches located at each node. No modification of the electronic components contained in the nodes is required. Thus, a ring network may be protected against failures at a relatively low additional cost.

Finally, the aforementioned embodiments are intended to be merely illustrative. Numerous other embodiments may be devised by those having ordinary skill in the art without departing from the scope of the following claims.

I claim:

1. A self healing SONET network comprising
    a plurality of active electronic nodes interconnected by optical fibers into a working ring, each of said nodes including an add-drop multiplexer, and
    a passive protection optical fiber ring comprising a first protection optical switch associated with each of said active nodes and having a bypass state for permitting the protection ring to bypass the corresponding node and an interconnection state in which optical signals are transmitted between said protection ring and said working ring,
    each said active electronic node further comprising
    a first working optical switch having a normal state in which optical signals are received from said working ring into said node and a protection state in which optical signals are received from said protection ring into said node, via said first protection optical switch of said protection ring associated with said node and a second working optical switch having a normal state in which optical signals are transmitted from said node to said working ring and a protection state in which optical signals are transmitted from said node to said protection ring, via said first protection optical switch of said protection ring associated with said node.

2. The self healing SONET ring network of claim 1 wherein said first protection and said working optical switches are mechanical-optical switches.

3. The self healing SONET ring network of claim 1 wherein said first protection and said working optical switches are electro-optical switches.

4. The self healing SONET ring network of claim 1 wherein said protection ring further includes an amplifier for amplifying signals propagating thereon.

5. The self healing SONET ring network of claim 1 wherein the first protection optical switch of said protection ring adjacent to a failed component of said ring network operates in said interconnection state and wherein the remaining said first protection optical switches of said protection ring operate in said bypass state.

6. The self healing ring SONET network of claim 1 further comprising a second working ring formed by optical fibers which interconnect said active electronic nodes, and a second protection ring, comprising a second protection optical switch associated with each node having a bypass state, for permitting said second protection ring to bypass said node associated with said second protection optical switch, and an interconnection state, in which optical signals are transmitted between said second working ring and said second protection ring.

7. The self healing SONET ring network of claim 6 wherein said first protection signal optical switch of said first protection ring has an additional state in which optical signals are transmitted between said first protection ring and said second working ring and wherein said second protection optical switch of said second protection ring has an additional state in which said optical signals are transmitted between said first mentioned working ring and said second protection ring.

8. A self-healing SONET ring network comprising a plurality of active nodes interconnected by optical fibers to form an active working ring, each of said nodes including an add-drop multiplexor, a passive only protection optical fiber ring having a by-pass state distinct from each of said nodes, said add-drop multiplexors not being included in said protection optical fiber ring, and means located at each of said nodes for interconnecting said active working and said passive only protection rings, said interconnecting means including optical switching means in said active working ring, optical switching means in said passive only protection ring, and optical fibers interconnecting said active working ring optical switching means and said passive only protection ring optical switching means, whereby said interconnecting means has a by-pass state in which said passive only protection ring by passes said node in normal operation of the ring network and an interconnection state in which optical signals are interconnected between said active working and said passive only protection rings through said active working ring optical switching means and said passive only protection ring switching means in the event of a failure in the ring network.

9. The network of claim 8 wherein said network is a SONET network and wherein each node comprises an add-drop multiplexer.

10. The network of claim 8 wherein said optical switching means at each node comprises:

a first optical switch, having a bypass state for permitting said protection ring to bypass said node, and an interconnection state, in which optical signals are transmitted between said working ring and said protection ring, a second optical switch, having a normal state, for connecting optical signals propagating on said working ring into said node, and a protection state, for connecting, via said first optical switch, optical signals propagating on said protection ring into said node, and a third optical switch, having a normal state, for outputting optical signals from said node to said working ring, and a protection state, for outputting, via said first optical switch, optical signals from said node to said protection ring.

* * * * *